Figure 1:
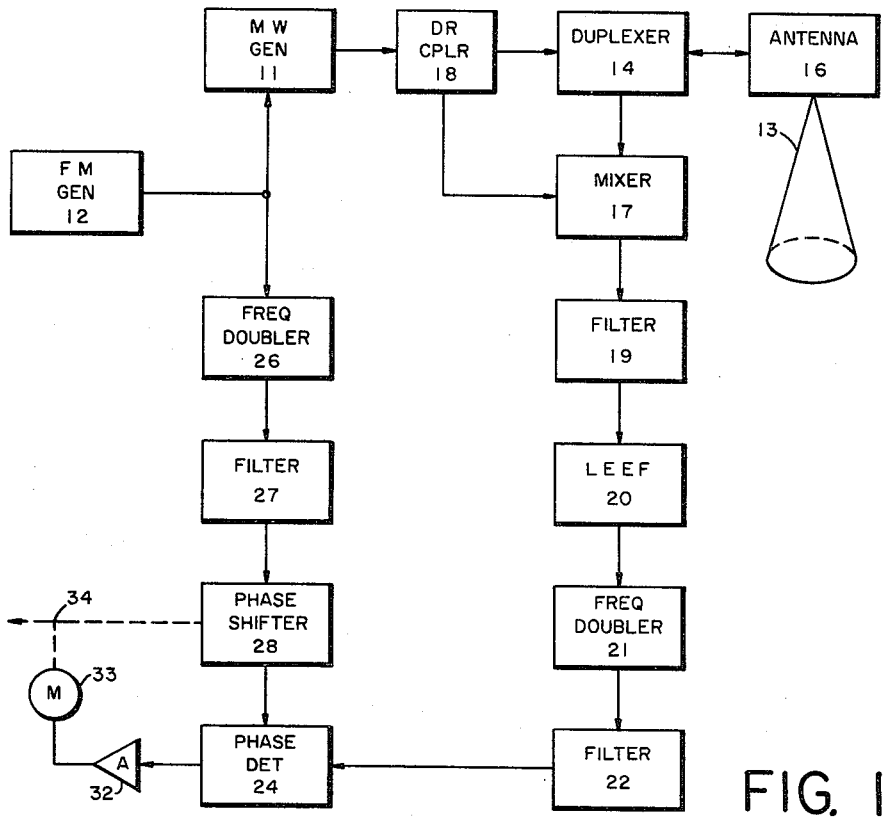

INVENTOR.
SOL BOLES
GUS STAVIS

BY
ATTORNEY

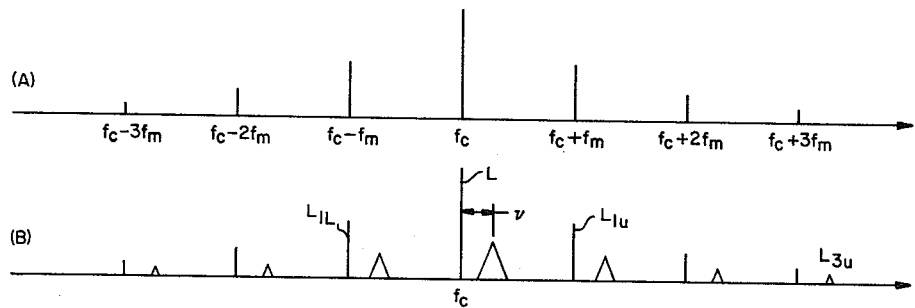
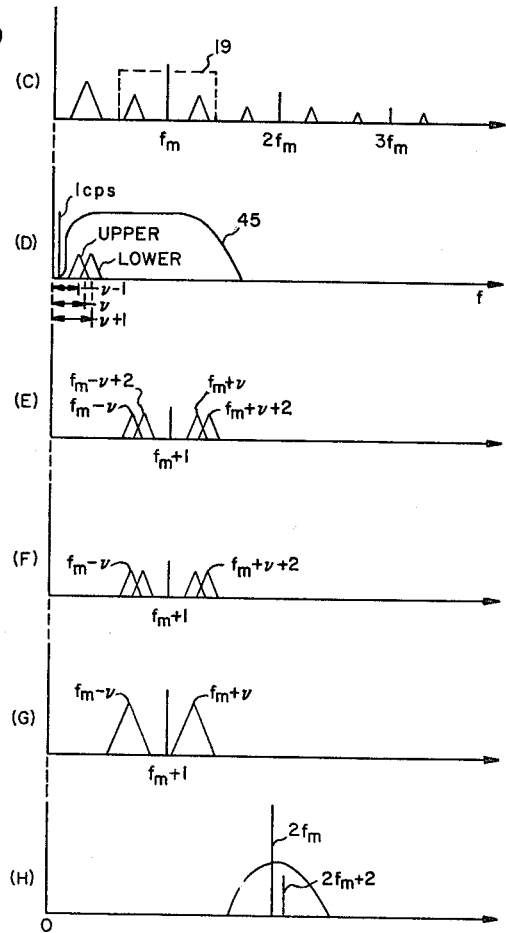
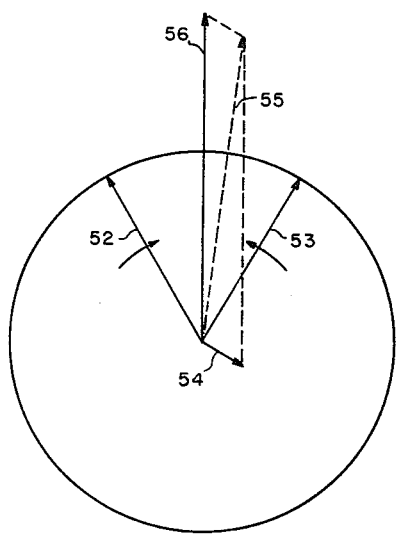
FIG. 3
FIG. 4
INVENTOR.
SOL BOLES
GUS STAVIS
BY H. A. Mackey
ATTORNEY

United States Patent Office 3,187,330
Patented June 1, 1965

3,187,330
RADAR LEAKAGE EFFECT ELIMINATION CIRCUIT
Sol Boles, Bronx, and Gus Stavis, Briarcliff Manor, N.Y., assignors to General Precision, Inc., a corporation of Delaware
Filed Feb. 7, 1963, Ser. No. 256,891
6 Claims. (Cl. 343—8)

This invention relates to radar devices and more particularly to a circuit for eliminating the leakage effect in Doppler radar altimeters and other similar devices. The circuit disclosed is particularly useful in a frequency modulated Doppler radar altimeter such as that disclosed in the patent application of Gus Stavis for Frequency Modulated Altimeter, Serial No. 39,360, filed June 28, 1960 now Patent No. 3,111,667.

When a system such as that disclosed in the above said application Serial No. 39,360 is utilized in an aircraft which is capable of low or zero velocities such as a helicopter, the leakage becomes a factor which cannot be overcome by conventional filtering techniques since the filtering would interfere with the signals producing the altitude information.

A number of different circuits have been employed for overcoming the leakage effect. However, in every instance they depend on highly accurate and very stable balanced modulators to remove or minimize the leakage. These devices or circuits have provided varying degrees of success depending on the care used in construction and maintenance since the balanced modulators employed are extremely critical.

The leakage effect elimination circuit disclosed herein, like the prior art circuits, employs balanced modulators; however, additional means are provided whereby the balanced modulators are not critical in their operation. Such a circuit is more stable in its operation and may be constructed at a substantially lower cost.

One object of this invention is to provide a leakage effect elimination circuit which employs non-critical components only.

Another object of the invention is to provide a circuit which is stable and reliable in operation and is inexpensively manufactured.

Yet another object of the invention is to provide a leakage effect elimination circuit for use in Doppler radar altimeters suitable for use in aircraft which are capable of low velocities or velocties which approach zero.

The invention contemplates a leakage effect elimination circuit for use in a Doppler radar altimeter in which a conversion circuit receives a Doppler radar signal containing altitude information as well as a leakage signal. A signal generator supplies a fixed predetermined frequency to the conversion circuit whereby the leakage frequency only is converted to a different frequency which is displaced from its original frequency by an amount equal to the difference in frequency between the original value and the frequency of the signal generator. Thus, when the altitude is determined by the phase comparison method disclosed in application Serial No. 39,360, the converted leakage frequency will not affect the phase measurement since it is at a different frequency and will average out in one complete cycle of the difference frequency set forth above.

The foregoing and other objects and advantages of the invention will become more apparent from a consideration of the drawings and specification wherein one embodiment only of the invention is shown and described for illustration purposes.

Figure 2:
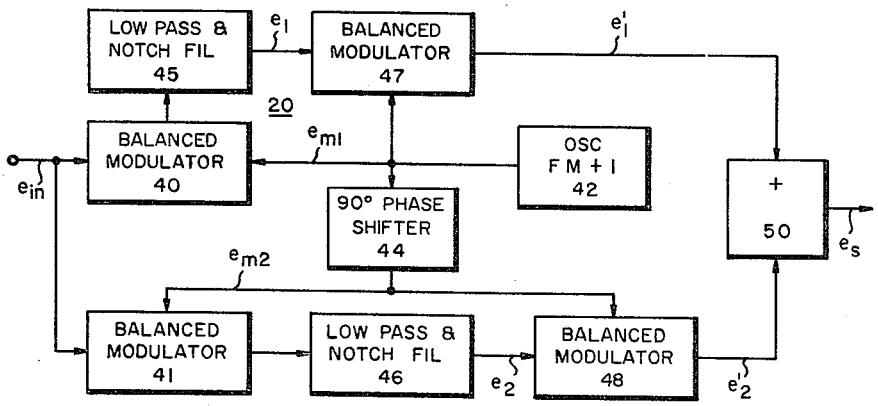

In the drawings:
FIGURE 1 is a block diagram of a frequency modulated Doppler radar altimeter embodying a novel leakage effect elimination filter constructed according to the invention;
FIGURE 2 is a detailed block diagram of the novel filter; and
FIGURES 3 and 4 are graphs illustrating the operation of the circuits shown in FIGURES 1 and 2.

In FIGURE 1 a complete airborne Doppler radar altimeter is shown in order to illustrate one application of the subject invention. The altimeter includes a microwave generator 11 which is frequency modulated by frequency modulating generator 12. Microwave generator 11 provides a frequency $fc$ which is modulated by a frequency $fm$ from FM generator 12. The modulated output is shown graphically by curve A in FIGURE 3.

This output is supplied to an antenna 16 through a directional coupler 18 and a duplexer 14. The energy thus supplied is radiated toward the earth or other object in a narrow beam 13 which is reflected from the earth or other object and received by the antenna. The received reflected energy undergoes the familiar Doppler shift and is in the form shown in curve B of FIGURE 3. It should be noted that leakage spikes labelled L occur at multiplies of the modulating frequency. The spikes are generated by incidental amplitude modulation in the transmitter output and/or finite path difference between the local oscillator and leakage signal from the transmitter. The received energy is applied to a mixer 17 through duplexer 14 along with a portion of the transmitted energy which is applied to mixer 17 by directional coupler 18.

Mixer 17 provides an output shown by curve C in FIGURE 3. This output is passed through a filter 19 the passband of which is shown in dotted line numbered 19 at C of FIGURE 3. The novel leakage effect elimination filter 20 shown in FIGURE 2 has its input connected to the output of filter 19. Before proceeding with a description of FIGURE 1, a description of the leakage elimination filter shown in FIGURE 2 will be completed since the nature of the signal passed by the filter is essential for a complete understanding of the operation of the altimeter.

A pair of balanced modulators 40 and 41 receive the output of filter 19. An oscillator 42 providing a frequency of approximately $fm \pm 1$ c.p.s. supplies an output to balanced modulator 40. The output of oscillator 42 is also applied to balanced modulator 41 through a 90-degree phase shifting circuit 44. Thus modulation in one instance involves the sine function of $fm \pm 1$ and in the other the cosine function of $fm \pm 1$. The output of both balanced modulators 40 and 41 takes the form shown by curve D of FIGURE 3 for the case of $fm+1$. Both outputs are passed through low-pass and notch filters 45 and 46, respectively. The characteristics of the filters are shown by the curve labelled 45 in D of FIGURE 3.

The output of oscillator 42 is also applied to another balanced modulator 47 which receives the output of filter 45, while the output of phase shifter 44 is applied to another balanced modulator 48 which receives the output of filter 46. The outputs of balanced modulators 47 and 48 are shown graphically in FIGURE 3, curves E and F, respectively. These two outputs are combined in a summing circuit 50.

The purpose of the filter 20 is to eliminate the effect of the leakage at frequency $fm$. This is accomplished by removing the leakage frequency in filters 45 and 46 and reinserting a different frequency $fm \pm 1$ c.p.s. in place thereof and at a lower amplitude in balanced modulators 47 and 48, FIGURES 3E and F, which, as previously pointed out, will produce a running phase error when compared with the phase of the signal from generator 12 as will be described later in greater detail. The sine and cosine functions of $fm \pm 1$ are employed in a two channel system in order to eliminate the double spectra caused by demodulating with a frequency other than $fm$. Since the foldover takes place at $fm \pm 1$ in each channel a spike at one cycle per second is introduced. This spike is removed by the D.C. notch portion of filters 45 and 46. In addition the lower and upper sidebands do not overlie each other because of the asymmetric folding in the case illustrated, at $fm+1$. This double spectra persists through modulators 47 and 48. However, the sidebands at $(fm+\nu+2)$ and at $(fm-\nu+2)$, shown in curves E and F of FIGURE 3, cancel due to phase differences in summing circuit 50 while the sidebands at $fm \pm \nu$ add to provide an output having twice the amplitude of the output of each channel and shown graphically at G.

A better understanding of the invention from the quantitative point of view may be obtained by examining the voltages and mathematically determining the effect of the various circuits.

If the input voltage $e_{in}$ to the filter takes the following form (1) $e_{in} = \sin \nu t \cos \rho \left(t - \frac{\tau}{2}\right) +$ leakage signal at frequency $\rho$ and the two modulating frequencies supplied by oscillator 42 and phase shifter 44, $e_{m1}$ and $e_{m2}$, respectively, take the forms (2) $\quad e_{m1} = \sin (\rho + a)t$
(3) $\quad e_{m2} = \cos (\rho + a)t$ then the normalized voltages $e_1$ and $e_2$ at the outputs of filters 45 and 46, respectively, are (4) $e_1 = \sin \nu t \sin (\rho+a)t \cos \rho \left(t - \frac{\tau}{2}\right)$ $= \sin \nu t \sin \left(at + \frac{\rho \tau}{2}\right)$ $= \cos \left[(\nu-a)t - \frac{\rho \tau}{2}\right] - \cos \left[(\nu+a)t + \frac{\rho \tau}{2}\right]$ and (5) $e_2 = \sin \nu t \cos \rho \left(t - \frac{\tau}{2}\right) \cos (\rho+a)t$ $= \sin \nu t \cos \left[-\frac{\rho \tau}{2} - at\right]$ $= \sin \nu t \cos \left[at + \frac{\rho \tau}{2}\right]$ $= \sin \left[(\nu+a)t + \frac{\rho \tau}{2}\right] + \sin \left[(\nu-a)t - \frac{\rho \tau}{2}\right]$ The normalized outputs of $e_1'$ and $e_2'$ of modulators 47 and 48, respectively, are (6)

$e_1' = \sin [(\rho+a)t] \cos \left[(\nu-a)t - \frac{\rho \tau}{2}\right]$ $- \sin [(\rho+a)t] \cos \left[(\nu+a)t + \frac{\rho \tau}{2}\right]$ $= \sin \left[(\rho+\nu)t - \frac{\rho \tau}{2}\right] + \sin \left[(\rho+2a-\nu)t + \frac{\rho \tau}{2}\right]$ $- \sin \left[(\rho+2a+\nu)t + \frac{\rho \tau}{2}\right] - \sin \left[(\rho-\nu)t - \frac{\rho \tau}{2}\right]$ $+$ leakage at $(\rho+a)$ (The leakage $\rho + a$ corresponds to frequency $fm+1$ previously described and arises due to finite unbalance in modulator 47.)
and (7)

$e_2' = \sin \left[(\nu+a)t + \frac{\rho \tau}{2}\right] \cos (\rho+a)t$ $+ \sin \left[(\nu-a)t - \frac{\rho \tau}{2}\right] \cos (\rho+a)t$ $= \sin \left[(\rho-\nu)t - \frac{\rho \tau}{2}\right] + \sin \left[(\nu-\rho)t + \frac{\rho \tau}{2}\right]$ $+ \sin \left[(\rho+\nu)t - \frac{\rho \tau}{2}\right] + \sin \left[(\nu-\rho-2a)t - \frac{\rho \tau}{2}\right]$ $= -\sin \left[(\rho-\nu)t - \frac{\rho \tau}{2}\right] + \sin \left[(\rho+\nu)t - \frac{\rho \tau}{2}\right]$ $- \sin \left[(\rho+2a-\nu)t + \frac{\rho \tau}{2}\right] + \sin \left[(\rho+2a+\nu)t + \frac{\rho \tau}{2}\right]$ $+$ leakage at $(\rho+a)$ When expressions (6) and (7) are summed we get (8)

$e_s = \sin \left[(\rho+\nu)t - \frac{\rho \tau}{2}\right] - \sin \left[(\rho-\nu)t - \frac{\rho \tau}{2}\right]$ $= \sin \left[\nu t + \rho \left(t - \frac{\tau}{2}\right)\right] + \sin \left[\nu t - \rho \left(t - \frac{\tau}{2}\right)\right]$ $= \sin \nu t \cos \rho \left(t - \frac{\tau}{2}\right) +$ leakage at $(\rho+a)$ From this it is obvious that the summed output is identical to the input except for the conversion of the leakage frequency from $\rho$ to $(\rho+a)$ where $a$ is the difference between the frequency of oscillator 42 and the leakage frequency from filter 19.

The output of filter 20 is doubled in a circuit 21 which produces an output having the form shown in curve H of FIGURE 3. This is passed through a filter 22 having a narrow passband centered at a frequency equal to $2fm$. The output of generator 12 is frequency doubled in a circuit 26 then filtered in a circuit 27 which is similar to filter 22. Filter 27 has its output connected to a phase detector 24 by a phase shifter 28 while the other input of phase detector 24 is connected to filter 22. The output of phase detector 24 is connected to an amplifier 32 which drives a motor 33 which provides a rotation of an output shaft 34. Shaft 34 drives phase shifted 28 so as to null the output of phase detector 24. Thus, the position of shaft 34 in addition to nulling the output of phase detector 24 indicates the phase differential between the frequency doubled output of generator 12 and the spikes at frequency $2fm$ which results from doubling the Doppler spectrum. This phase difference is proportional to altitude since it is a direct measure of the total transmit time of the microwave energy to the ground or other object and back. The servo loop which includes amplifier 32 and motor 33 provides the necessary smoothing to eliminate the running phase error at frequency $2fm+2$ c.p.s.

The vector diagram shown in FIGURE 4 illustrates how the leakage at $fm$ results in an error in the altitude measurement. Vectors 52 and 53 rotating at the same frequency and in opposite directions are derived from the upper and lower sidebands passed by filter 19. Vector 54 represents the leakage at frequency $fm$. Thus the resultant is a combination of these three vectors and is shown at 55. The error is introduced since the actual phase which should be compared with the phase of generator 12 is shown at 56. By changing the leakage frequency to a different frequency, such as $fm \pm 1$ c.p.s., the vector 54 rotates with respect to vectors 52, 53 and 56 at 1 c.p.s., which when averaged by the servo loop, in the instance described, eliminates the error introduced by the leakage.

The particular frequency which the leakage frequency is converted to is not critical provided it is made sufficiently different from the modulating frequency $fm$ so that at all times, within the range which the modulating frequency is permitted to vary, the converted leakage frequency will be above or below it. Thus, the oscillator 42 may provide a frequency equal to $fm$ plus or minus about ½ cycle or more.

As a practical matter an upper limit is reached since conventional filtering may be employed to advantage whenever the minimum velocity expected of the aircraft will keep the Doppler radar which contains the altitude information out of the filter envelope. Thus the need for this particular invention is eliminated whenever the minimum velocity of the aircraft or vehicle is above about five knots; since in those instances conventional filtering will not destroy the altitude information and will effectively remove the leakage spike without destroying the altitude information.

While only one embodiment of the invention has been disclosed and described in detail for illustration purposes, applicants wish it clearly understood that the invention is not limited to the specific details shown and described.

What is claimed is:

1. A leakage effect elimination circuit for use in a Doppler radar altimeter comprising,
    first and second identical conversion channels each including modulator means for receiving a Doppler radar signal containing altitude information as well as a leakage signal at a predetermined frequency,
    and means for applying a fixed frequency slightly different in frequency from said leakage frequency to the modulator means of said first and second conversion channels whereby said leakage signal is converted to a frequency displaced from its original frequency by an amount equal to the difference in frequency between the original leakage frequency and the frequency applied to the modulator means.

2. The circuit set forth in claim 1 in which the frequency applied to the first and second channels differs from the leakage frequency by about one cycle per second.

3. A leakage effect elimination circuit for use in a Doppler radar altimeter comprising,
    first and second identical conversion channels each including modulator means for receiving a Doppler radar signal which includes altitude information along with a leakage signal at a predetermined frequency.
    means for generating a sine and cosine function of a fixed frequency slightly different in frequency from the predetermined leakage frequency and for applying the sine function to the modulator means of said first channel and the cosine function to the modulator means of said second channel whereby the leakage frequency in each of said channels is converted to a frequency displaced from said leakage frequency by an amount equal to the difference in frequency between the original leakage frequency and the generated frequency,
    and means for combining the converted outputs of the said first and second channels to remove all the frequencies created for the first time in the conversion process.

4. The circuit set forth in claim 3 in which the generated frequency differs from the leakage frequency by about one cycle per second.

5. A leakage effect elimination circuit for use in a Doppler radar altimeter comprising,
    a first balanced modulator for receiving a Doppler radar signal which includes altitude information along with a leakage signal at a predetermined frequency,
    an oscillator for generating a frequency other than the predetermined leakage frequency,
    means for applying the generated frequency to said first balanced modulator for converting the leakage frequency to a value equal to the difference in frequency between the leakage and oscillator frequencies,
    a second balanced modulator for receiving the said Doppler radar signal and the said leakage signal at the predetermined frequency,
    a phase shifting circuit for shifting the phase of the oscillator output 90° and applying the said phase shifted output to the said second balanced modulator for converting the leakage frequency to a value equal to the difference in frequency between the leakage and oscillator frequencies,
    first and second identical filter means responsive to the first and second balanced modulators, respectively, for removing the component of the leakage frequency at the converted frequency and for passing the converted Doppler signals only,
    a third balanced modulator means responsive to the output of the said first filter means and the said oscillator for restoring the Doppler signal to its former frequency and for recreating the leakage frequency at a lower amplitude and at a frequency differing from the original leakage frequency by an amount equal to the difference between the original leakage frequency and the oscillator frequency,
    a fourth balanced modulator responsive to the said second filter means and the phase shifted oscillator output for restoring the Doppler signal to its former frequency and for recreating the leakage frequency at a lower amplitude and at a frequency differing from the original leakage frequency by an amount equal to the difference between the original leakage frequency and the frequency of the oscillator,
    and means for combining the outputs of the third and fourth balanced modulators so as to eliminate all frequencies generated for the first time in the said balanced modulators.

6. The circuit set forth in claim 5 in which the frequency generated by the oscillator differs from the leakage frequency by about one cycle per second.

References Cited by the Examiner

UNITED STATES PATENTS 2,909,656  10/59  Meyer _____ 343—8

FOREIGN PATENTS 797,057  6/58  Great Britain.

CHESTER L. JUSTUS, *Primary Examiner.*